C. R. KEERAN.
PRESSURE INDICATOR.
APPLICATION FILED AUG. 17, 1918.
1,414,474.
Patented May 2, 1922.
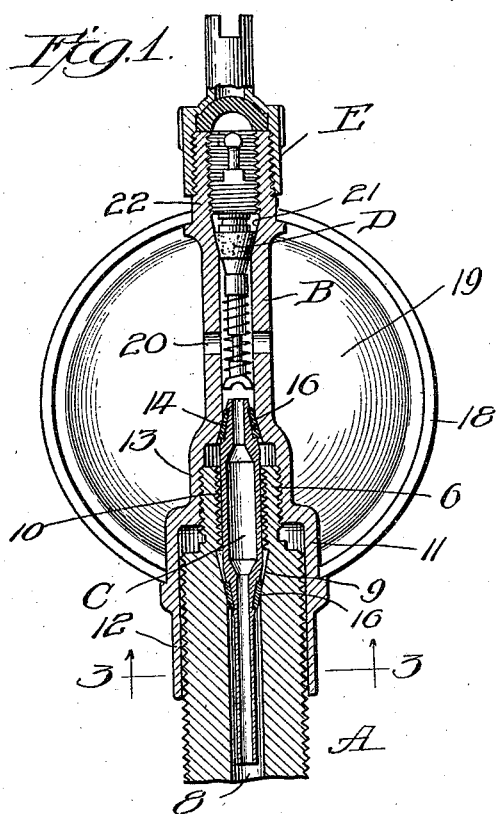
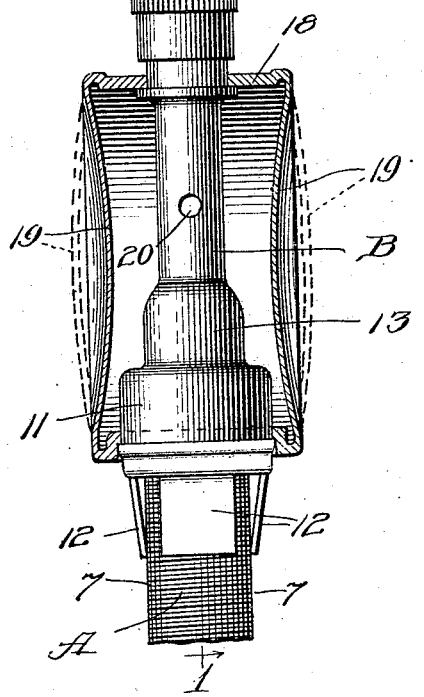
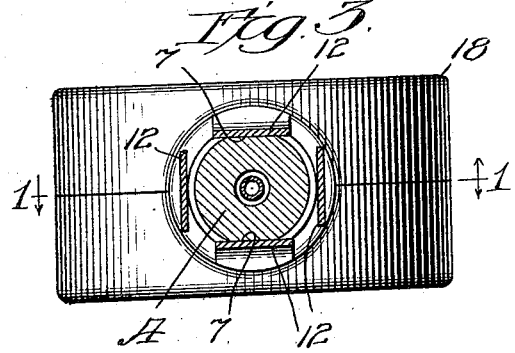
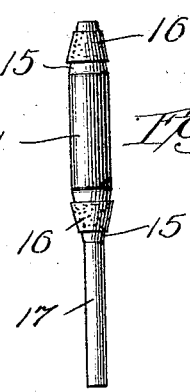
WITNESSES:
Harry S. Gaither
INVENTOR
Charles R. Keeran
BY
Banning & Banning
ATTORNEYS

UNITED STATES PATENT OFFICE.

CHARLES R. KEERAN, OF CHICAGO, ILLINOIS.

PRESSURE INDICATOR.

1,414,474.   Specification of Letters Patent.   Patented May 2, 1922.

Application filed August 17, 1918. Serial No. 250,355.

*To all whom it may concern:*

Be it known that I, CHARLES R. KEERAN, a citizen of the United States, residing at Chicago, in the county of Cook and State of Illinois, have invented certain new and useful Improvements in Pressure Indicators, of which the following is a specification.

This invention is concerned with a device for indicating a fluctuation in the pressure of an elastic fluid contained within an enclosed chamber. It is particularly suitable for use in connection with pneumatic tires for vehicle wheels, being adapted for ready attachment to the ordinary form of valves supplied therewith. For the sake of illustration, the following description will treat the present invention in its relation to pneumatic tires, although its application to other uses should be clearly borne in mind.

It is common knowledge that when a pneumatic tire is punctured, the tire becomes soft, or entirely flat. These conditions generally arise while the vehicle is in use, and often without the knowledge of the occupants thereof. When operated under these conditions the tire may suffer irreparable injury, so that it is highly desirable to provide, if possible, some means which will warn those using the vehicle whenever the pressure within the tire becomes dangerously low.

With the end in view of providing a device which will accomplish this purpose, I have devised the present invention, comprising a simple, inexpensive and compact structure capable of being attached to the ordinary tire valve without impairing in any way its functions. It consists, in brief, of a chamber having one or more curved walls capable of flexing inwardly or outwardly, depending upon the degree of pressure within the tire. These flexing movements are accompanied by a sharp crack or report so loud as to be distinctly heard by those in the immediate vicinity, thereby giving an audible indication of a change in pressure within the tire.

A device answering generally to this description, and which embodies the features of my present invention, is disclosed in the accompanying drawing, in which—

Figure 1 is a longitudinal section through a tire valve equipped with the present device;

Fig. 2 is a longitudinal view, partly in section, taken at right angles to Fig. 1;

Fig. 3 is a cross sectional view taken on line 3—3 of Fig. 1; and

Fig. 4 is a detail in elevation of the inner tube, which forms a seal between the valve stem and extension piece secured thereto.

The present device is illustrated in connection with a tire valve of common construction, the valve stem, designated as A, having fitted thereon an extension stem or piece B, between which parts a seal is maintained by a hollow inner tube C, the valve core D being mounted within the extension stem B and receiving protection by the usual cap E. The parts A, D and E are common to the valves now generally in use, while those designated as B and C are special to this invention. These various elements will now be described in detail.

As part of the tire valve, I have shown in the drawing a stem A secured to the tire in any suitable manner, the outer end thereof being reduced to form a nipple 6. Both the stem and nipple are exteriorly threaded in the usual manner, the stem being flattened as at 7 on opposite sides thereof (see Figs. 2 and 3). Interiorly the stem is provided with a bore 8 tapered as at 9 to form a seat, and threaded as at 10 near its extremity.

The construction thus far described is common and well known. I have fitted to the valve stem certain other elements, however, this being accomplished by first unscrewing and removing the valve cap E and valve core D. These elements comprise an extension piece B in the form of a stem, having one end enlarged as at 11, from which depend a plurality of tongues 12, two of which engage with spring action against the flattened sides 7 of the stem A to resist rotary movement thereupon. The stem or tube B is contracted and interiorly threaded as at 13 to screw onto the threaded nipple 10 of the casing, and beyond this point is formed interiorly with a seat 14 corresponding, in a measure at least, to the seat 9 within the valve stem, but having its sides inversely inclined. Positioned within the bore 8 of the stem is an inner tube C, best shown in Fig. 4, formed with an enlarged portion each end of which is tapered as at 15, and suitably recessed to provide therein a seat for a gasket 16. When assembled in the manner shown in Fig. 1, one gasket 16 is fitted against the seat 9 within the stem A, and the other gasket 16 is fitted against the seat 14 within the extension stem B, so as to provide a passageway through these elements which is tight against the escape of air. Obviously, the extension stem may be screwed upon the nipple 10 as far as necessary to insure a tight fit of each gasket against its seat. This stem C is preferably formed with an extension 17 to facilitate its removal from the stem B in case this should be desired.

Surrounding the extension stem is a chamber preferably formed of two suitably united sections, having a peripheral wall 18 and curved side walls 19 capable of flexing inwardly or outwardly. The walls 18 are secured to the extension piece in a manner to form a tight connection therewith, and communication from within the extension piece to the chamber is provided by means of one or more apertures 20. According to this construction, a passage is always maintained between the chamber and the tire interior such that the pressure of air within each will always be the same. Normally, at atmospheric pressure, the walls 19 tend to flex inwardly, as shown in Fig. 2, but when a sufficient pressure of air has been introduced into the tire, the walls 19 will flex outwardly, somewhat as indicated by the dotted lines in Fig. 2.

The upper end of the extension piece B (as viewed in the drawing) is formed in a manner similar to the corresponding end of the valve stem A, that is, it is provided with a flaring inner wall 21 forming a seat for the valve core, designated as D, which is screwed as a unit into the upper end 22 of the extension piece, appropriately threaded for this purpose. A valve cap E is arranged to fit upon the upper end of the tube. Further details of the valve core D are thought to be unnecessary, as they may follow the usual construction.

In supplying air under compression to the tire, the usual procedure is followed by making a connection with the upper end of the extension stem B after first removing the cap. When the tire is sufficiently inflated, the side walls 19 will be bulged outwardly, and in moving from inner to outer positions they will snap audibly, thereby indicating that the pressure within the tire has reached a predetermined point. As long as this pressure is maintained, the side walls will continue to remain outwardly bulged, and the fact that the tire is sufficiently inflated can always be determined by a visual inspection of these walls. This fact may also be determined by feeling of the walls, in case darkness prevent a clear view. When, however, the pressure within the tire falls below the desired point, these walls will flex inwardly to the accompaniment of a loud report such as to give warning that the tire is then unfit for use. It will be obvious that this warning will be given whether the vehicle be moving or stationary.

It is manifest that my invention is particularly adapted for use with pneumatic tires on vehicle wheels, although it may be applied to other containers in which fluid is stored under pressure. Accordingly, I do not wish to be limited to the exact form shown, nor to the particular use suggested, but desire that other alternative forms or modifications embodying the principles of this invention be included within the scope of my patent, as defined in the claims hereto appended.

I claim:

1. In combination with a fluid container having an opening from which projects a stem, a pressure indicator comprising a member fitted to the stem and maintaining communication with the interior of the container, the member being formed with walls adapted to be moved to the accompaniment of a report under the direct influence of a change in pressure within the container of predetermined amount without permitting escape of the fluid to the atmosphere, and a valve fitted to the member for preventing the escape of fluid within the container, substantially as described.

2. In combination with a fluid container having an opening equipped with a valve including a stem and a core operatively arranged within the stem, a pressure indicator comprising a member fitted to the stem and arranged to accommodate the valve core, the member being formed with walls adapted to be moved to the accompaniment of a report under the direct influence of a change in pressure within the container of predetermined amount without permitting escape of the fluid to the atmosphere, substantially as described.

3. In combination with a fluid container having an opening equipped with a valve including a stem and a core operatively arranged within the stem, a pressure indicator comprising a member fitted to the stem and arranged to accommodate the valve core, the member being provided with sound producing means operable when the pressure within the container fluctuates past a given point but without itself affecting such pressure, substantially as described.

4. In combination with a fluid container, a pressure indicator associated therewith and in communication with the interior thereof, the pressure indicator being equipped with audible means arranged for actuation when the pressure within the container fluctuates past a given point, the pressure within the container being unaffected by actuation of the indicator, substantially as described.

5. In combination with a fluid container, a pressure indicator associated therewith and in communication with the interior thereof, the pressure indicator being equipped with means arranged for actuation when the pressure within the container fluctuates either up or down past a given point, the pressure within the container being unaffected by actuation of the indicator and the indicator combining in itself a single indicating device which is both visible and audible in its operation, substantially as described.

6. In combination with a tire valve having a stem and core therewithin, a pressure indicator comprising an extension piece adapted for connection with the stem and to accommodate the core, means for sealing the connection between the stem and extension piece whereby communication is maintained between the stem and core without loss of pressure, and a flexing element associated with the extension piece arranged for actuation with fluctuations in the pressure of air within the tire past a given point but without itself affecting such pressure, the flexing element when actuated giving an audible indication of such pressure fluctuation, substantially as described.

7. In combination with a tire valve having a stem and core therewithin, a pressure indicator comprising an extension piece adapted for connection with the stem and to accommodate the core, means for sealing the connection between the stem and extension piece whereby communication is maintained between the stem and core without loss of pressure, and a flexing element associated with the extension piece arranged for actuation with fluctuations in the pressure of air within the tire past a given point, the flexing element when actuated giving a visual indication of such pressure fluctuation, substantially as described.

8. In combination with a fluid container, a pressure indicator associated therewith and in communication with the interior thereof, the pressure indicator being equipped with audible means arranged for actuation without escape of fluid when the pressure within the container varies beyond certain limits, substantially as described.

9. In combination with a fluid container, a pressure indicator associated therewith and in communication with the interior thereof, the pressure indicator being equipped with audible and tangible means arranged for actuation without escape of fluid when the pressure within the container varies beyond certain limits, substantially as described.

CHARLES R. KEERAN.

Witness:
EPHRAIM BANNING.